United States Patent
Brand

(10) Patent No.: US 9,062,421 B2
(45) Date of Patent: Jun. 23, 2015

(54) PROTECTION SYSTEM FOR TENSION MEMBERS OF A STRUCTURE FOR COLLECTING ICE ACCUMULATIONS DETACHING FROM A TENSION MEMBER

(71) Applicant: DYWIDAG-Systems International GmbH, Munich (DE)

(72) Inventor: Werner Brand, Freising (DE)

(73) Assignee: DYWIDAG-Systems International GmbH, Munich (DE)

( * ) Notice: Subject to any disclaimer, the term of this patent is extended or adjusted under 35 U.S.C. 154(b) by 0 days.

(21) Appl. No.: 14/445,761

(22) Filed: Jul. 29, 2014

(65) Prior Publication Data

US 2015/0026901 A1     Jan. 29, 2015

(30) Foreign Application Priority Data

Jul. 29, 2013    (DE) ........................ 10 2013 012 429

(51) Int. Cl.
| | |
|---|---|
| *H02G 7/16* | (2006.01) |
| *E01D 11/00* | (2006.01) |
| *E01D 19/16* | (2006.01) |
| *E04C 5/08* | (2006.01) |
| *E01D 11/04* | (2006.01) |

(52) U.S. Cl.
CPC . *E01D 19/16* (2013.01); *E04C 5/08* (2013.01); *H02G 7/16* (2013.01); *E01D 11/04* (2013.01)

(58) Field of Classification Search
USPC .................................... 14/21, 22; 174/40 TD IPC ............... H02G 7/16; E01D 11/00,11/02, 11/04
See application file for complete search history.

(56) References Cited

U.S. PATENT DOCUMENTS

| | | | |
|---|---|---|---|
| 3,761,865 A * | 9/1973 | Bomgaars et al. ............ 439/451 |
| 6,518,497 B1 | 2/2003 | Allaire et al. |
| 6,880,193 B2 * | 4/2005 | Figg et al. ......................... 14/21 |
| 7,950,093 B2 * | 5/2011 | Brand et al. ...................... 14/22 |
| 7,992,357 B2 * | 8/2011 | Dannawi et al. ........... 52/223.14 |

FOREIGN PATENT DOCUMENTS

| | | |
|---|---|---|
| DE | 1 216 956 A | 5/1966 |
| JP | H05-33 311 A | 2/1993 |

* cited by examiner

*Primary Examiner* — Gary Hartmann
(74) *Attorney, Agent, or Firm* — Muncy, Geissler, Olds & Lowe, P.C.

(57) ABSTRACT

A protective system having a protective device for tension members for collecting ice accumulations detaching from a tension member that is anchored on the structure in a first abutment and in a second abutment. The tension member is exposed to climatic conditions by the section running between the abutments. To guarantee protection from falling ice accumulations, the protective device has a hose-shaped envelope, which surrounds the tension member on the circumferential side. The hose-shaped envelope is disposed on a partial longitudinal section of the tension member in an axially compressed or folded manner in a first operating position, and is movable, with the aid of a drive system, to a second operating position, in which the hose-shaped envelope extends over the length of the tension member in the stretched state.

13 Claims, 4 Drawing Sheets

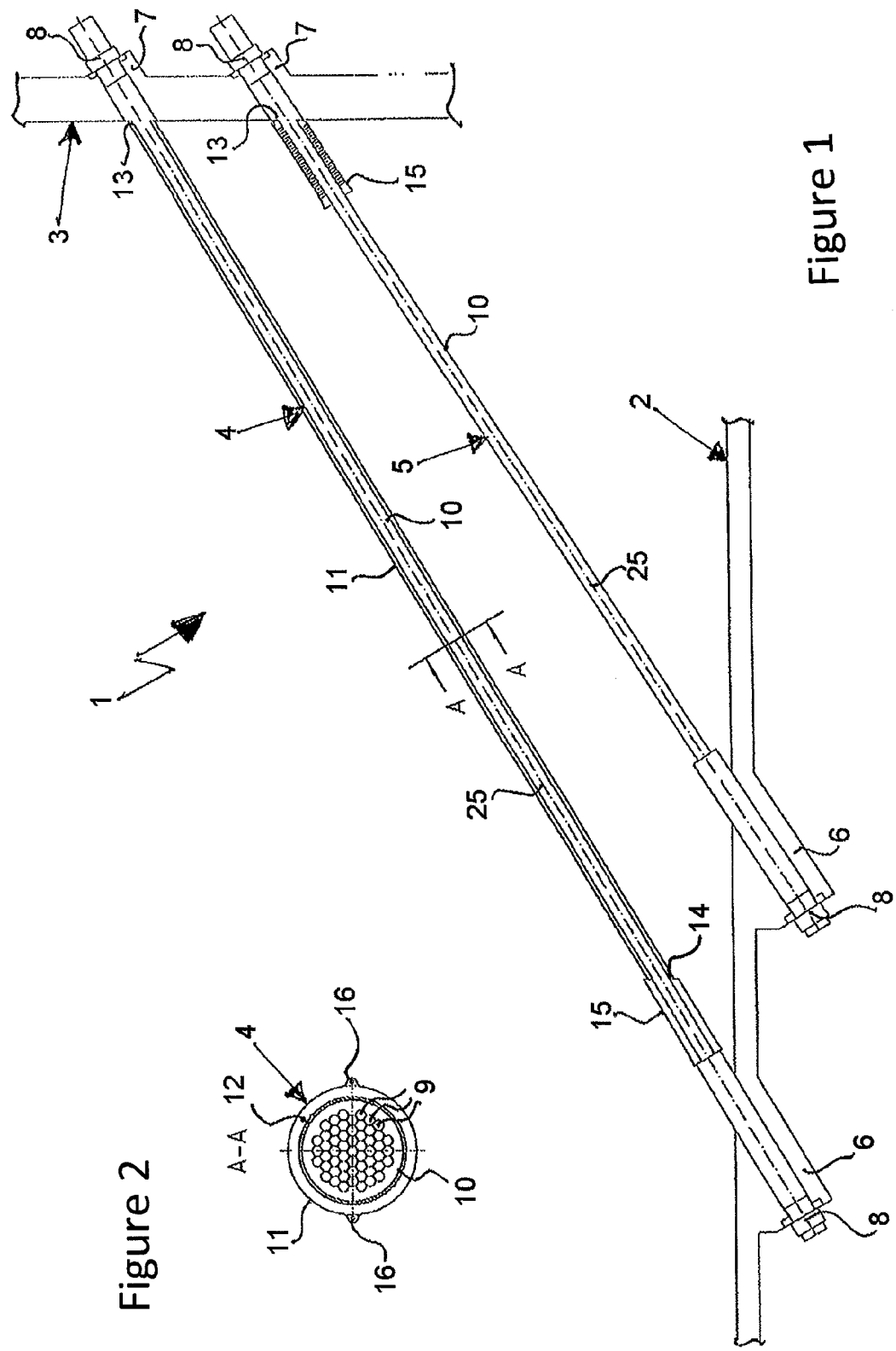

PROTECTION SYSTEM FOR TENSION MEMBERS OF A STRUCTURE FOR COLLECTING ICE ACCUMULATIONS DETACHING FROM A TENSION MEMBER

This nonprovisional application claims priority under 35 U.S.C. §119(a) to German Patent Application No. 10 2013 012 429.8, which was filed in Germany on Jul. 29, 2013, and which is herein incorporated by reference.

BACKGROUND OF THE INVENTION

1. Field of the Invention

The invention relates to a protection system for tension members of a structure, in particular for a stay cable of a bridge structure, for collecting ice accumulations detaching from a tension member.

2. Description of the Background Art

In building construction, tension members are used primarily to suspend components, for example stay cables for suspending a bridge girder of a bridge structure on a pylon or for staying overhanging components, for example a roof on a foundation. For this purpose, the tension members are anchored by their ends in abutments on the components. The area between the abutments is exposed to the outdoors and is therefore subjected to the influences of the weather.

Under special climatic conditions, such as high relative humidity combined with frequent changes in temperature or freezing of damp snow, there is the danger of ice formation and ice accumulations over the circumference and along the length of the tension members. Upon reaching a critical size and weight, or due to external influences such as wind, thaws, shocks and the like, the ice accumulations run the risk of becoming detached and falling to the ground from a great height and causing injury/damage to people and property. This problem arises in particular in cable-stayed and suspension bridges, in which the traffic flowing beneath the cables is directly exposed to falling ice accumulations, and often only closing the bridge structure remains as a last resort to avoid damage.

To remove ice accumulations on the outer circumference of tension members, it is known for workers to carry out this work manually on site, which, however, is a very exhausting and time-consuming task. In addition, wind and weather must permit such deployment, which means that a dependency on the weather conditions exists. As a result, there has been no lack of effort in the past to develop other means of deicing tension members that are exposed to the outdoors.

Mobile, autonomous deicing devices have been used, which encompass and are movable along a tension member. With the aid of removal tools such as brushes and scrapers on the device, adhering ice accumulations are removed from the tension member.

In another deicing attempt, pressure waves were applied to the stay cables of a bridge structure by means of the rotor of a helicopter. Part of the ice accumulations detached from the stay cables and fell to the ground.

A device and a method are known from U.S. Pat. No. 6,518,497 B1, in which a tension member is subjected to a defined twisting motion over its length. The ice adhering to the surface of the tension members is unable to follow the resulting deformations and therefore breaks off.

JP H05-33 311 A discloses a hollow cylindrical carriage for removing snow accumulations, which movably rests on the cable and has drive wheels and cutting tools. The drive wheels set the carriage in a helical motion running along the cable, cutting tools which are in engagement with the snow accumulations freeing the cable of snow accumulations.

An arrangement for removing ice from high voltage overhead lines is described in DE 1 216 956 A, in which each conductor cable is surrounded by an elastic insulating sleeve. A hose is inserted between the conductor cable and the insulating sleeve, to which compressed air may be applied as needed. The associated increase in volume generates a blasting effect on the ice accumulations, so that they break away.

What the aforementioned approaches have in common is that ice accumulations become detached during the course of deicing and fall down, so that the area beneath the tension members must be protected, at least for the duration of the deicing measure.

In another approach, thermal systems are used, in which resistance heating wires are integrated into the tension member. The application of electrical energy to the resistance heating wires is intended to cause ice accumulations to melt. The disadvantage in this case is the enormous energy demand to be expended.

In addition, passive protective systems exist in the form of hydrophobic coatings, which are intended to prevent the adhesion of ice accumulations, and/or thermally absorbent coatings, which heat up due to heat absorption and cause the ice accumulations to melt. Although passive systems are economically superior to the systems mentioned at the outset, they are unable to reliably eliminate the danger of ice forming on tension members.

SUMMARY OF THE INVENTION

It is therefore an object of the invention to provide a device for protecting the area beneath exposed tension members against falling ice accumulations effectively and reliably as well as at an economically justifiable cost.

The invention departs from the idea of wanting to either purposefully remove or prevent ice accumulations, which are ubiquitous according to the prior art. Instead, the invention provides for collecting detaching ice accumulations with the aid of a hose-shaped envelope which rests on the tension member and safely transporting them to the ground.

For this purpose a hose-shaped envelope is provided, which is pushed onto a relatively short longitudinal section of the tension member in an axially compressed state in a first operating position. When the detachment of ice accumulations from the tension member is to be expected, the hose-shaped envelope is placed, as a protective measure, from the first operating position into a second operating position, in which the envelope is pulled longitudinally over the tension member. The envelope changes from the compressed state to a longitudinally stretched state and envelops the tension member over its length. In the second operating position, the tension member laden with ice accumulations is thus disposed within the hose-shaped envelope over its entire length or at least over its dominant length. Since the hose-shaped envelope has a larger circumference than the tension member, a channel forms between the envelope and the tension member, in which the detached ice accumulations may be collected and safely removed.

A first advantage of the invention results from the complete enveloping of the tension member, which guarantees absolute protection against falling ice pieces. Thanks to the invention, the fact that ice accumulations fall down from the tension members even when the protective device is activated is completely ruled out. The danger of people or property sustaining injuries/damage is thus prevented.

Another advantage arises from the simplicity of the design, which does not require any complicated and therefore failure-susceptible technology and electronics, which is ultimately reflected in a higher dependability, low maintenance and repair expenditures and easy operation. A protective device according to the invention is thus an extremely economical approach in terms of both procurement and operation.

An advantage for the operator of appropriate structures has proven to be the fact that the hose-shaped envelope may be very quickly placed in the second operating position and the protective effect may thus be activated independently of the weather conditions. Disturbances during the course of operation, for example blocking traffic on a bridge, may thus be reduced to a minimum and postponed to times when the consequences are less severe, for example during the night.

The external mounting of the protective device on a tension member furthermore opens up the possibility of retrofitting existing structures with the device according to the invention at a later time, in order to benefit from the aforementioned advantages.

To be able to move the hose-shaped envelope from the first operating position to the second operating position as easily and unproblematically as possible, one embodiment of the invention provides for fixing the envelope on the structure or tension member by its first end and designing the rest of the envelope to slide longitudinally along the tension member. In this manner, the second operating position of the protective device according to the invention, in which the tension member is essentially completely enveloped over its entire length, may be reached solely by pulling the second end of the envelope.

The protective device advantageously comprises additional guide elements, along which the envelope slides when changing from the first operating position to the second operating position, and which thus ensure a smooth transition between the two operating positions. The guide elements may include one or multiple cables or rods, which run laterally to the tension member and axially parallel thereto and to which the envelope is movably connected, for example by providing eyelets through which the guide cables or rods are passed.

According to an embodiment of the invention, the protective device according to the invention has a tube piece which is also disposed on the tension member and which surrounds the latter at a slight radial distance. The length of the tube piece is dimensioned in such a way that the hose-shaped envelope may be accommodated by the tube piece in its first operating position, i.e., in the compressed state.

In an embodiment of the invention, the tube piece itself may be disposed in a stationary manner with respect to the tension member, for example it may be flanged into the pylon. However, an embodiment of the invention is preferred, in which the tube piece is connected to the free, movable end of the envelope and changes, together therewith, from the first operating position to the second operating position. In this manner, the tube piece forms a kind of carriage which slides along the tension member and releases the hose-shaped envelope toward the back.

In an embodiment of the invention, the diameter of the tube piece is adapted to the diameter of the tension member in such a way that sufficient clearance for passing over existing ice accumulations is present, on the one hand, and an accommodating space for the hose-shaped envelope is created in the annular gap resulting from the difference in diameter, on the other hand. In this embodiment, the envelope is thus located protectively within the tube piece in its first operating position.

Conversely, in another embodiment, the hose-shaped envelope rests on the outer circumference of the tube piece, which has the advantage that the tube piece has a defined contact and sliding surface against the tension member and the envelope is easily accessible from the outside.

Another embodiment of the invention is made up of a combination of the two embodiments described above, in which the tube piece has a double-walled design, and the annular space between the outer and inner tube walls is used to accommodate the hose-shaped envelope in the first operating position.

The hose-shaped envelope may be made of a foil-like, woven or net-like material, with the advantage that, in its first operating position, the envelope may be stored in the smallest amount of space by being folded. At the same time, an envelope of this type is characterized by its high strength and low weight. Materials of this type may have a single-layer or multilayer design and have additional reinforcements at weak points, which allows it to be custom-made for the application at hand. If vapor-permeable materials or materials having openings are used, the associated ventilation of the interior formed by the envelope ensures a drying of the envelope in its first or second operating position, which is conducive to the longest possible service life.

The circumference of the hose-shaped envelope is preferably at least 1.2 times the outer circumference of the tension member, extremely preferably at least 1.5 times the outer circumference. The channel-like space formed in this manner is large enough to easily pull the envelope onto the tension member, on the one hand, and to remove the ice accumulations, on the other hand.

According to another embodiment of the invention, it is possible to use the channel for conducting heated air for the purpose of removing a heavy accumulation of ice by melting the ice.

To reinforce the hose-shaped envelope, it may be advantageous to integrate a plurality of plane-parallel rings disposed coaxially at an axial distance from each other in the tubular envelope. The rings are used to absorb the weight of the envelope laden with ice, on the one hand, and facilitate an orderly folding and unfolding of the envelope, on the other hand, when changing from the first operating position to the second operating position, or vice versa, since the arrangement and number of annular folds in the compressed envelope is determined by the rings.

A cable winch, which is in active engagement with one or multiple driving cables running axially parallel to the tension member, is preferably used for driving a device according to the invention. In one refinement of this idea, the at least one driving cable is designed as a continuous cable, which is guided over deflection rollers in the first abutment area and in the second abutment area. By driving and correspondingly controlling one of the two deflection rollers or both deflection rollers, the tubular envelope may be moved from the first operating position to the second operating position and vice versa.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 1 shows a partial sectional view of a cable-stayed bridge having an embodiment of a protective device according to the invention;

FIG. 2 shows a sectional view of a cable stay of the cable-stayed bridge illustrated in FIG. 1 along the line A-A;

DETAILED DESCRIPTION

Figure 3:
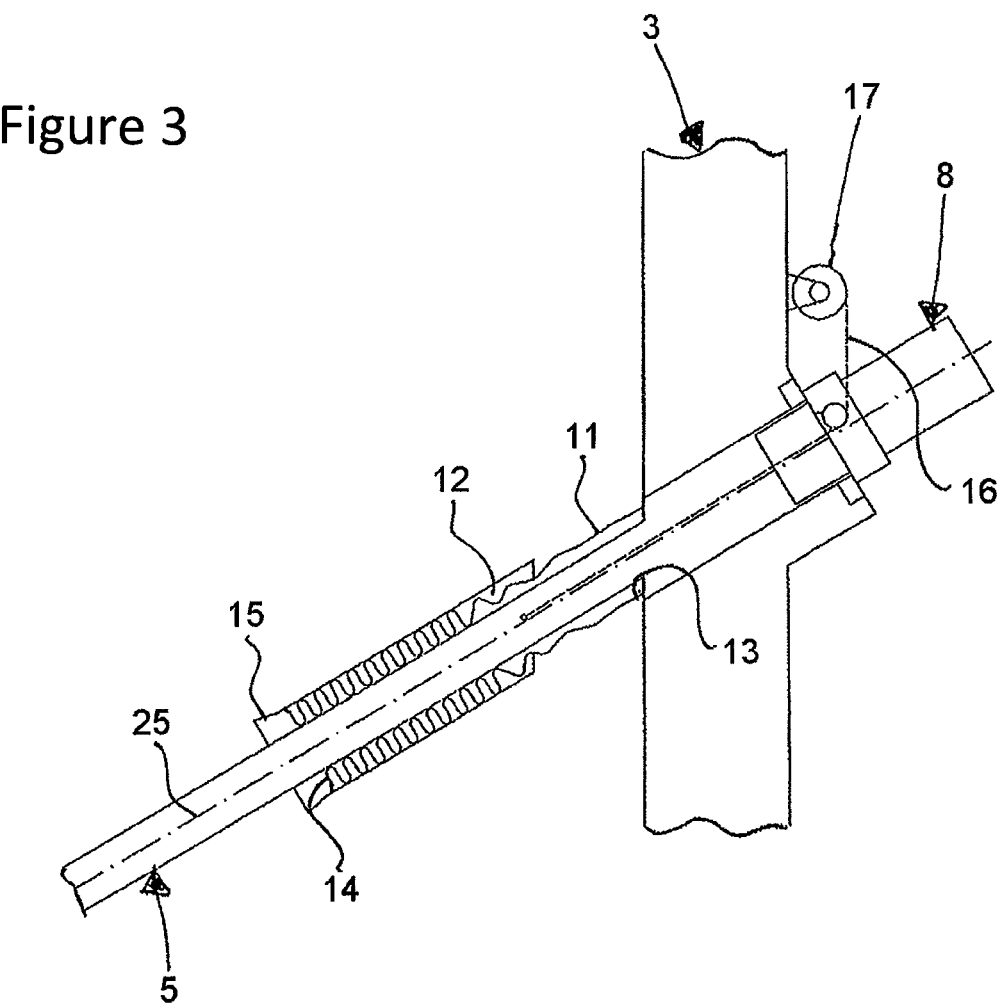
FIG. 3 shows a sectional view of the upper abutment area of a cable stay illustrated in FIG. 1 on a larger scale.

FIGS. 1 through 3 shows a first specific embodiment of the invention, based on the example of an only partially illustrated cable-stayed bridge 1, whose girder 2 is suspended on a pylon 3 with the aid of a plurality of cable stays 4, 5, only two cable stays 4, 5 being illustrated in FIG. 1, which are representative of all other cable stays. Cable stays 4, 5 are anchored in girder 2 in a lower abutment 6 and in pylon 3 in an upper abutment 7 with the aid of known anchoring 8. Upper cable stay 4 having an activated protective device is shown in FIG. 1, while lower cable stay 5 represents the inactive state of the protective device according to the invention, which is discussed specifically in even further detail.

As is apparent from FIG. 2, each cable stay 4, 5 comprises a plurality of strands 9, which together result in a strand bundle, which is surrounded by a rigid tubing 10 made of steel or plastic. However, cable stays which are formed by a parallel wire bundle, by fully enclosed cables and the like are also within the scope of the invention.

According to FIGS. 1 through 3, a protective device according to the invention comprises a hose-shaped envelope 11 made of a foil-like or woven material. The structure of the material may be closed or also vapor-permeable or have openings. Envelope 11 may be formed from one or multiple material layers and/or have local reinforcements, e.g., in contacted areas and therefore areas subject to wear.

The type of material makes it possible to move hose-shaped envelope 11 from a first operating position, in which hose-shaped envelope 11 is compressed into a very small space, to a second operating position, in which hose-shaped envelope 11 is in a longitudinally stretched form.

As is apparent from FIG. 2, hose-shaped envelope 11 rests on each of cable stays 4, 5 and surrounds the latter at a slight radial distance, whereby a channel-shaped annular space 12 is formed. Hose-shaped envelope 11 is rigidly connected to pylon 3 by first end 13. For this purpose, first end 13 may be designed in the form of a flange-like collar, which is clamped against pylon 3 by a flange ring.

However, opposite end 14 of tubular envelope 11 is designed to be longitudinally shifted against cable stay 4, 5, where it is surrounded by a rigid tube piece 15, to which it is connected in a force-fitting manner. Lower end 14 of hose-shaped envelope 11 is also axially shiftable together with tube piece 15 on cable stay 4, 5 and may be moved from the first operating position, as illustrated in FIG. 1 on the basis of cable stay 5, to the second operating position, as embodied by upper cable stay 4 in FIG. 1, and vice versa. Characteristic for the first operating position is the fact that, by moving tube piece 15 back in the direction of upper abutment 7, in which tube piece 15 is ultimately connected to pylon 3, tubular envelope 11 is placed in a folded state and accommodated in an annular space forming a receptacle between tube piece 15 and cable stay 4, 5.

The protective device is activated as needed by lowering tube piece 15, including connected hose-shaped envelope 11, in the direction of lower abutment 6, until the second operating position is reached, according to the illustration of cable stay 4 in FIG. 1. Cable stay 4 laden with ice accumulations thus becomes encased over its entire length, hose-shaped envelope 11 surrounding cable stay 4, 5 collecting the falling ice in annular space 12 and transporting it downward.

As is apparent primarily from FIGS. 2 and 3, the drive for moving tube piece 15, including hose-shaped envelope 11, from the first operating position to the second operating position or vice versa, comprises a drive system having two parallel driving cables 16 running on either side of tubular envelope 11, which are fastened to tube piece 15 in a force-fitting manner by their ends and may be pulled in or let out via a cable winch 17 disposed on pylon 3.

Figure 4:
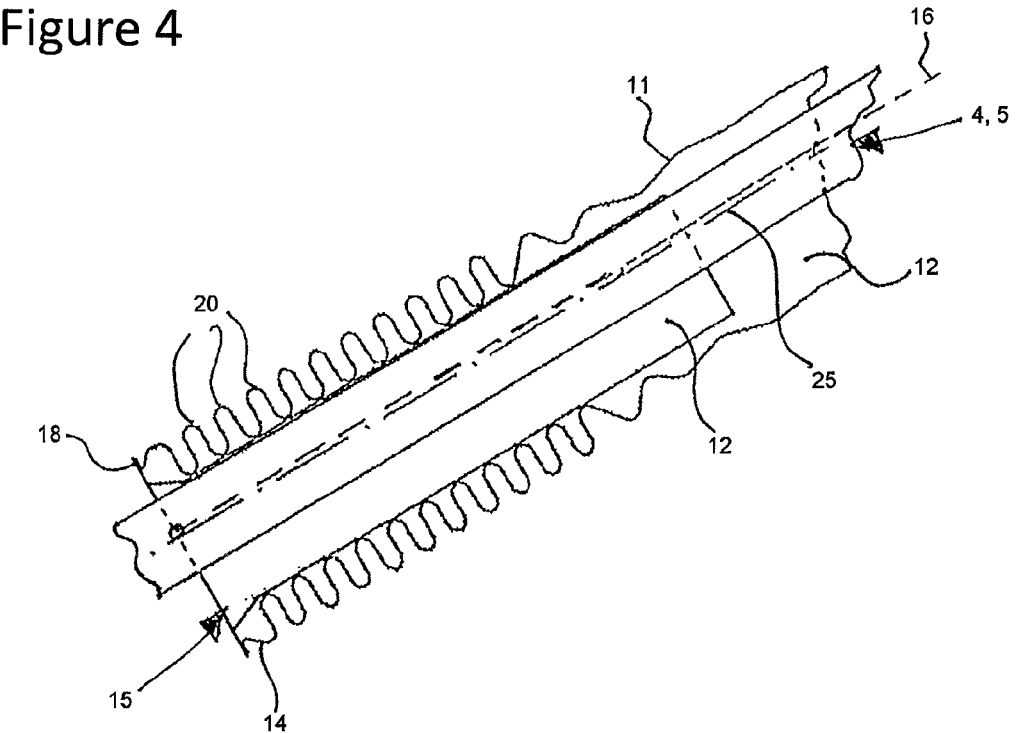
FIG. 4 shows a sectional view of an embodiment of a protective device according to the invention.

The embodiment of the invention illustrated in FIG. 4 differs only in the design of tube piece 15', but otherwise corresponds to the embodiment described under FIGS. 1 through 3, so that the discussion for those figures applies and the corresponding reference numerals are used. With its outer circumference, tube piece 15' illustrated in FIG. 4 forms a receptacle for hose-shaped envelope 11 in the first operating position. Hose-shaped envelope 11 comes to rest on the outer circumference of tube piece 15', forming a plurality of annular folds 20 in the manner of a bellows. The free end of tube piece 15' is widened, forming an annular flange 18, and is used to fasten lower end 14 of hose-shaped envelope 11. A driving cable 16 for controlling the movement of tube piece 15' is connected to each side of annular flange 18 in a symmetrical configuration.

Figure 5:
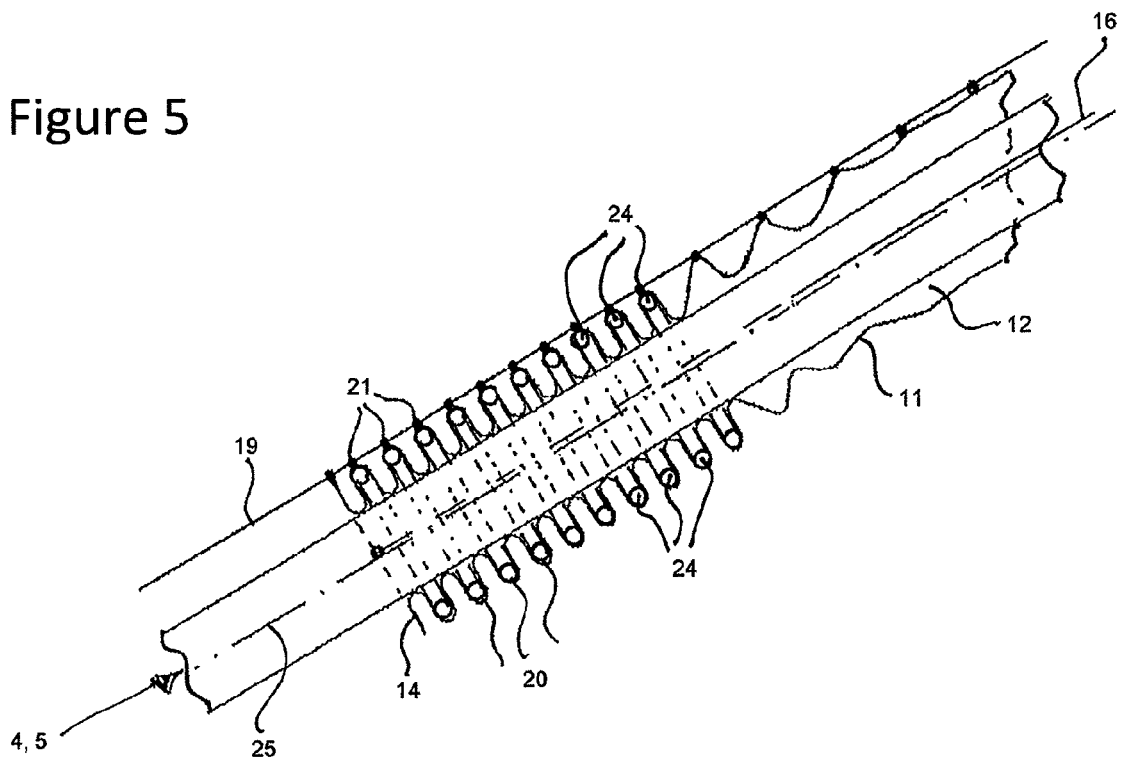
FIG. 5 shows a sectional view of an embodiment of a protective device according to the invention.

The subject matter of FIG. 5 is an embodiment of the invention which does not require tube piece 15, 15'. Hose-shaped envelope 11 illustrated in FIG. 5 is suspended in a longitudinally shiftable manner at its upper apex on a guide cable 19 running parallel to cable stay 4, 5. The suspension takes place, for example, via eyelets 21 in envelope 11, through which guide cable 19 is guided. The tube-shaped envelope may be pulled along guide cable 19 in the direction of upper abutment 7 into the first operating position, forming a plurality of annular folds 20, or conversely it may be lowered in the direction of lower abutment 6 into the second operating position.

In the embodiment according to FIG. 5, rings 24 may be optionally integrated into envelope 11. For this purpose, rings 24 are fastened to envelope 11 by their outer circumference in a plane-parallel, coaxial position, for example by providing clips or annular pockets surrounding envelope 11, through which rings 24 are guided. These rings 24 reinforce envelope 11 and define an ordered arrangement of folds when switching back to the first operating position.

Figure 6:
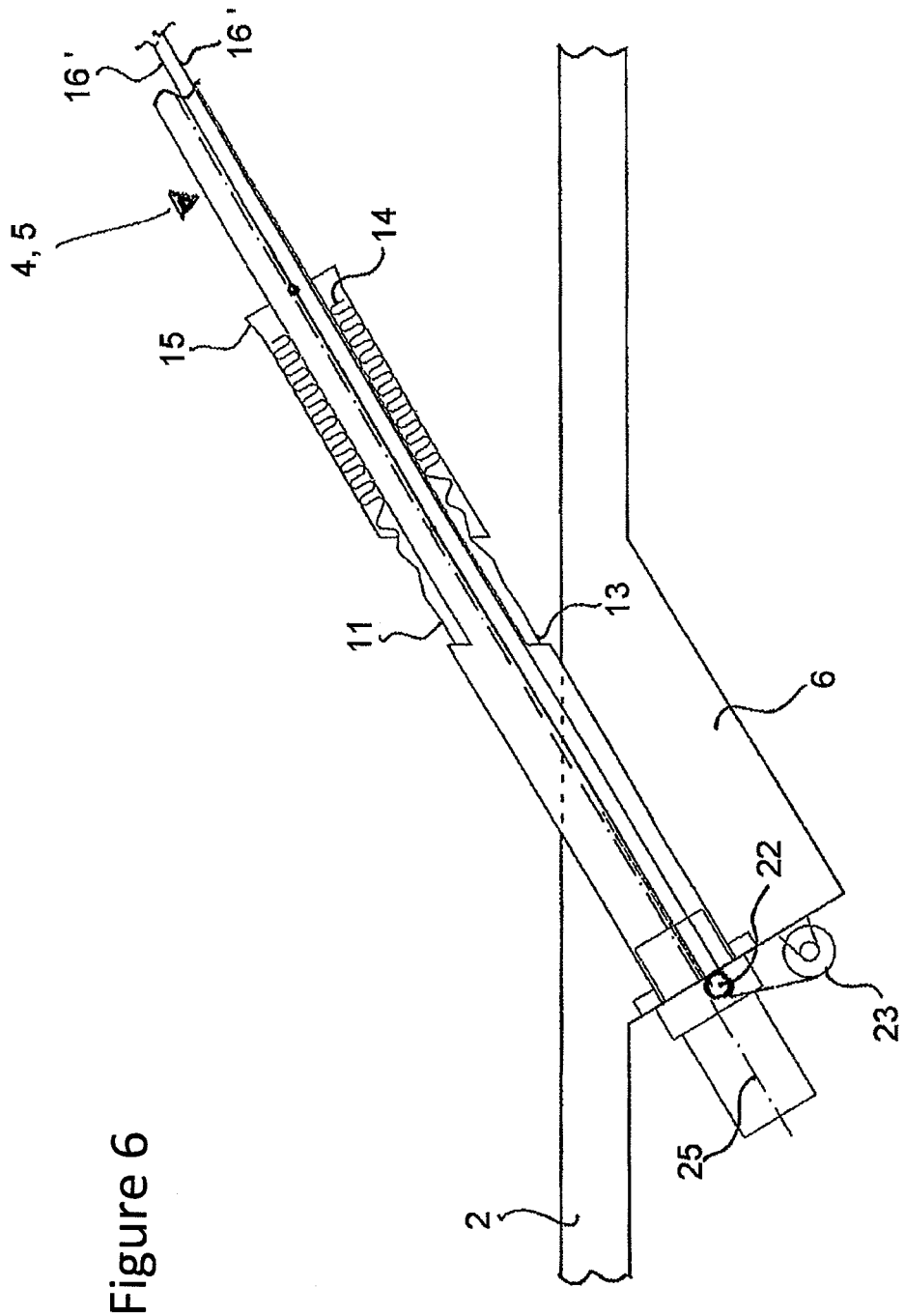
FIG. 6 shows a sectional view of an embodiment of a protective device according to the invention.

The embodiment according to FIG. 6 differs from the embodiments described above due to the fact that, in the first operating position of the protective device according to the invention, hose-shaped envelope 11 is in the folded state in lower abutment area 6, and the second operating position is reached by pulling free end 14 of hose-shaped envelope 11, together with tube piece 15, to upper abutment 7 and achieving the encasing of cable stay 4, 5.

The drive system of this embodiment of the invention comprises two driving cables 16', each of which is continuously guided in a deflection roller 22 disposed in abutment areas 6, 7 and which are coupled at points with tube piece 15 on each side of hose-shaped envelope 11. One of deflection rollers 22 may be driven via a rotary drive 23, whereby driving cables 16' and thus hose-shaped envelope 11, are set in motion.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A protective system for tension members of a structure, the protective system comprising:
    a tension member anchored on the structure in a first abutment by a first end and in a second abutment by a second end, and being exposed to climatic conditions by the section running between the abutments;
    a protective device for the tension member for collecting ice accumulations detaching from the tension member, the protective device comprising a hose-shaped envelope, which surrounds the tension member on a circumferential side, the hose-shaped envelope being disposed in an axially compressed or folded manner on a partial longitudinal section of the tension member in a first operating position, and extending over a length of the tension member in a stretched state in a second operating position; and
    a drive device via which the hose-shaped envelope is movable from the first operating position to the second operating position.

2. The protective system according to claim 1, wherein the first end of the hose-shaped envelope is fixable on the structure or is fixed on the tension member, and the second end of the hose-shaped envelope is designed to be movable relative to the tension member.

3. The protective system according to claim 1, wherein guide elements are disposed along the tension member, along which the hose-shaped envelope slides when switching from the first operating position to the second operating position, the guide elements being formed by one or multiple guiding cables.

4. The protective system according to claim 1, wherein the device comprises a tube piece, which surrounds the tension member at a slight radial distance and which is destined for accommodating the hose-shaped envelope in the first operating position.

5. The protective system according to claim 4, wherein the tube piece is arranged in a stationary manner on the tension member or is disposed on the structure.

6. The protective system according to claim 4, wherein the tube piece is fixedly connected to the movable second end of the hose-shaped envelope and is movably arranged on the tension member.

7. The protective system according to claim 4, wherein the tube piece accommodates the hose-shaped envelope with its inner circumference or outer circumference.

8. The protective system according to claim 1, wherein the hose-shaped envelope is made of a foil, woven or net material.

9. The protective system according to claim 1, wherein the hose-shaped envelope is made of a vapor-permeable material or has ventilation openings.

10. The protective system according to claim 1, wherein the circumference of the hose-shaped envelope is at least 1.2 times the circumference of the tension member, preferably at least 1.5 times the circumference of the tension member.

11. The protective system according to claim 1, wherein at least one ring is integrated into the hose-shaped envelope, which is located on a vertical plane with respect to the tension member longitudinal axis and/or the longitudinal axis of the envelope.

12. The protective system according to claim 1, wherein the drive device comprises at least one driven driving cable, which extends along the tension member and is connected in a force-fitting manner to the free end of the envelope.

13. The protective system according to claim 12, wherein the driving cable is designed as a continuous cable which is guided via a deflection roller in the first abutment area and/or the second abutment area.

* * * * *